No. 649,675. Patented May 15, 1900.
J. POMEROY.
METHOD OF MAKING WHIPS, &c.
(Application filed Mar. 21, 1898.)
(No Model.)
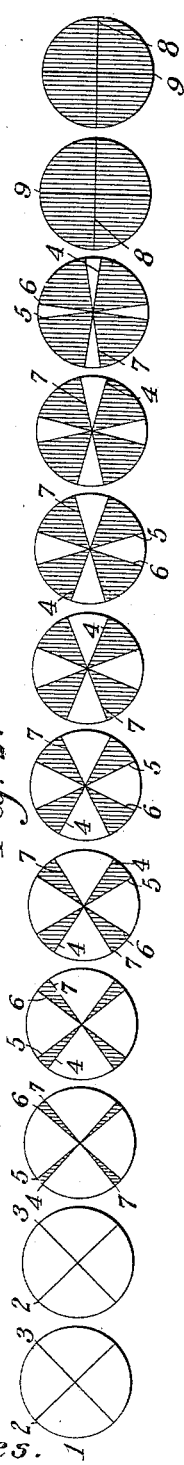
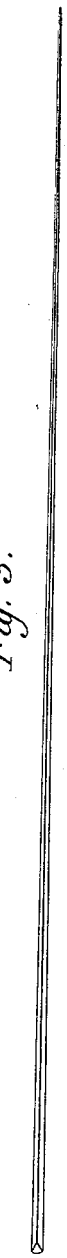
Fig. 1.  Fig. 2.  Fig. 3.  Fig. 4.  Fig. 5.  Fig. 6.  Fig. 7.
Witnesses.
Alex. Scott
Jas. W. Graham
Inventor.
Julian Pomeroy
by Kenyon & Kenyon
Attys.

UNITED STATES PATENT OFFICE.

JULIAN POMEROY, OF SPRINGFIELD, MASSACHUSETTS.

METHOD OF MAKING WHIPS, &c.

SPECIFICATION forming part of Letters Patent No. 649,675, dated May 15, 1900.

Application filed March 21, 1898. Serial No. 674,569. (No model.)

*To all whom it may concern:*

Be it known that I, JULIAN POMEROY, a citizen of the United States, residing in Springfield, in the county of Hampden and State of Massachusetts, have invented a new and useful Method of Making Whips, Fishing-Rods, or Similar Articles, of which the following is a full, clear, and exact specification, reference being had to the accompanying drawings, which form a part hereof.

The invention relates to a method of making whips or similar articles out of a piece of ratan, wood, or other material, and it is especially designed for the manufacture of such articles out of ratan or similar stalks.

One part of the invention relates to the method of dividing or cutting a piece of ratan or other suitable material into portions or strips adapted for use in making whips or similar articles.

Heretofore it has been the practice in the manufacture of whips and similar articles to divide the stalk into two or, at the most, into four strips, and then by a succession of operations to trim the sides of these strips, and thus prepare them for being put together or combined so as to form a completed whip. These old methods have involved a large number of separate operations, each one necessarily increasing the cost of the product. The article formed thereby has been in many respects imperfect and unsatisfactory. Moreover, by these old methods it has never been possible to make more than one whip out of a single stalk of ratan or similar material, and frequently more than one stalk has been required for each whip.

The objects of the present invention are to simplify the method of making such articles, to decrease the cost by the saving both of material and of labor, and also to improve the quality of the product.

The invention consists, first, in the method of making a tapering article, such as a whip, out of a piece of suitable material, such as ratan, which consists in cutting or dividing the entire piece into a sufficient number of tapering strips to make more than one whip or other article of the kind which is being manufactured, then trimming the inner surfaces of the strips which are to be united in the same whip or other article so as to make those surfaces fit one another when the strips are put together and so as to make these strips, when properly combined, form one complete full whip or other article, and then uniting these strips in any suitable way. In the best form of the invention the material is cut into eight tapering strips and the inner faces of the strips which are to be united in forming the same whip are trimmed so that the inner faces of each strip are at substantially the same angle to each other throughout their length, the size of this angle being proportioned to the number and size of the strips to be united in forming a whip or whatever article is being made.

The invention also consists in the method of making tapering articles, such as whips, out of pieces of suitable material, such as ratan, which consists in dividing the material into strips tapering throughout the whole or a part of their length, according to whether the whip is to have a butt portion or not, by cutting the material upon lines of which any two adjacent lines converge or diverge opposite the portions of the strip to be tapered, so as to divide the material into a sufficient number of tapering strips to make more than one whip or other article, each strip having an outer and two inner surfaces, the edges of the outer surface converging along the tapered portion of the strip, then trimming the inner surfaces so as to make them at substantially the same angle to each other throughout their length, the size of this angle being proportioned to the number and size of the strips to be united in forming a whip or other article, and then uniting the strips. In the best form of the invention the ratan or other material is cut upon lines extending to the axis of the material.

The invention also consists in the method of dividing a piece of suitable material, such as ratan, into strips, each adapted for use in making tapering articles, such as whips, which consists in severing or cutting such material along helicoidal surfaces intersecting each other, the adjacent surfaces of cleavage or section alternately converging toward and diverging from each other from each end of the piece of material. In the best form of the invention the material is divided in this way into aliquot portions, and the helicoidal surfaces are made to intersect each other at the axis of the piece.

The invention also consists in other features and steps hereinafter described and claimed.

My improved method is illustrated in the accompanying drawings, in which—

Figure 1 represents, diagrammatically, a stalk of ratan, showing the lines of splitting or cleavage which are made in the material in carrying out my method in the best manner known to me. Fig. 2 shows a series of cross-sections of the stalk, representing the lines of cutting or cleavage at twelve different points along the length of the stalk. The first two sections at the left hand show the lines of cleavage at the butt portions, there being here only two lines of cutting through the axis of the stalk. In the third section four lines of cleavage or cutting are shown passing through the axis of the stalk, thereby splitting the stalk into eight parts, all of which are tapering. In the fourth section the lines of cutting diverge still more, and so on until in the section next to the last there are again only two lines of cleavage, the stalk being here separated into four parts to form the butt portions at the other end of the stalk. Fig. 3 represents one of the eight strips into which the stalk is split. Fig. 4 contains a series of cross-sections taken at different points along this strip. Fig. 5 contains a similar series of cross-sections, showing the shape of the strip after its sides have been trimmed. Fig. 6 shows a completed whip made by combining four of these strips. Fig. 7 contains a series of sections of this completed whip, showing the manner in which the strips are put together.

Similar numbers denote similar parts in the different figures.

1 is a stalk of ratan or other suitable material. Beginning at one end—for example, at the left-hand end, as represented in Figs. 1 and 2—the stalk is split into four equal parts by cutting it on the lines 2 and 3. (See Fig. 2.) These lines of cut pass through the axis of the stalk and are made at right angles to each other, so as to divide this part of the stalk into four equal parts. The stalk is cut in this way for a distance equal to the length which is to be given to the butt portions in the completed whip. From this point on the stalk is split into eight parts by being cut on the diagonal lines 4, 5, 6, and 7. These four lines of cut or cleavage or surfaces of section pass through the axis, but the lines 4 and 5 diverge from each other and the lines 6 and 7 diverge from each other, while the lines 5 and 6 converge and the lines 4 and 7 converge. At the middle of the stalk these lines or surfaces of section are equidistant and cut the stalk into eight equal tapering parts. The lines of cutting continue in the manner already described until, as represented in the last two sections at the right in Fig. 2, the lines of cutting 4 and 7 have merged into the line 8 and the lines of cutting 5 and 6 have merged into the line 9. It will be seen that the right-hand end of the stalk is cut into four equal parts on the lines 8 and 9, thereby forming the butt portions at that end. The stalk is thus divided into eight equal strips, each of which has a butt portion equal in size to one-quarter of a stalk, and a tapering portion tapering gradually from the butt portion to the tip. One of these strips is represented in Fig. 3. Fig. 4 contains a series of cross-sections representing the shape of this strip at different points.

It is apparent that the strips may be made either with a butt portion or without a butt portion. If they are made without a butt portion, the strips taper throughout their entire length.

The stalk is cut upon lines of which any two adjacent lines converge or diverge opposite the portions of the strip to be tapered. In the form of the method just described the material is divided into a sufficient number of strips to make two complete whips. Each strip is so cut as to have an outer and two inner surfaces, the edges of the outer surface converging along the tapered portion of the strip and the inner faces having substantially helicoidal surfaces. The inner faces of the strip are then cut away or trimmed in any suitable manner, so as to reduce the strip to the proper size and shape for being combined with other strips to form the whip or other article. Fig. 5 contains a series of cross-sections of the strip taken at the same points as the sections shown in Fig. 4 and representing the shape of the strip after its faces are properly trimmed. These inner faces after being trimmed are at substantially the same angle to each other throughout their length. In the form shown, as four strips of the same size are to be combined together in making a whip, the inner faces are trimmed so as to be at a right angle to each other. The strip is then ready to be combined with other strips which have been similarly treated, so as to form the completed article. Four strips prepared in this way are united, as represented in Figs. 6 and 7, and thereby form a whip. The four strips may be united in any suitable manner, as by using a suitable kind of glue. The whip-stock thus produced may also be lined and covered in the usual manner.

Fig. 6 is a representation of the whip formed by uniting four strips in the manner described, and Fig. 7 is a series of cross-sections of the whip thus produced.

As a result of this method two whips or similar articles are manufactured out of a single stalk of material. Of the eight strips into which the single stalk is cut four of them are trimmed and united in the manner already described, so as to form one whip, and the other four are trimmed and united in a similar manner, so as to form the second whip.

The enamel or skin of the material is preserved throughout the entire length of the stalk. No appreciable part of it is cut away or wasted. The finished whip has an outer shell or coating of this enamel, which extends entirely around the whip at every point and reaches from end to end thereof. This adds strength and elasticity to the article. The strength of the article is also increased by the fact that along the middle line of each strip the fiber of the material extends from end to end.

Another advantage resulting from my improved method is that the strips produced thereby are naturally and necessarily straight, and when combined in the manner described form a straight true article which has no tendency to be permanently bent or curved at the tip end.

My improved method is entirely distinct from any particular form of apparatus that may be devised or employed for putting it into practice. For example, the stalk can be cut by hand, a suitable hand-tool, such as a knife or saw, being used for the purpose, or the method can be carried out by suitable automatic machinery.

It is manifest that my improved method secures great economy both in the amount of material or number of stalks used in producing a given number of whips or other articles and in the amount of time and labor consumed in doing the work. The article produced by this method is also superior in character to the whips or other articles heretofore made from split material.

I do not herein claim the new stalk or strip which is the product of my improved method, as I have claimed the product in a separate application—to wit, Serial No. 739,181, filed December 4, 1899.

Having described my invention, what I claim as new, and desire to secure by Letters Patent, is—

1. The method of making tapering articles such as whips out of pieces of suitable material, which consists in dividing the material into strips, tapering throughout the whole or a part of their length, by cutting the material upon lines, of which any two adjacent lines converge or diverge opposite the portions of the strip to be tapered, so as to divide the material into a sufficient number of tapering strips to make more than one article, each strip having an outer and two inner surfaces, the edges of the outer surface converging along the tapered portion of the strip, then trimming the inner surfaces, so as to make them at substantially the same angle to each other throughout their length, the size of this angle being proportioned to the number and size of the strips to be united in forming an article, and then uniting the strips.

2. The method of making tapering articles such as whips out of pieces of material such as ratan which consists in dividing the material into strips tapering throughout the whole or a part of their length, by cutting the material upon lines extending to the axis of the material, of which any two adjacent lines converge or diverge opposite the portions of the strip to be tapered, so as to divide the material into a sufficient number of tapering strips to make more than one article, each strip having an outer and two inner surfaces, the edges of the outer surface converging along the tapered portion of the strip, then trimming the inner surfaces so as to make them at substantially the same angle to each other throughout their length, the size of this angle being proportioned to the number and size of the strips to be united in forming an article, and then uniting the strips.

3. The method of making a whip out of a stalk of material such as ratan which consists in cutting the entire stalk into eight tapering strips, then trimming the inner surfaces of the strips which are to be united in the same whip, so as to make those faces at substantially the same angle to each other throughout their length, the size of this angle being proportioned to the number and size of the strips to be united in forming a whip, and then uniting the strips, substantially as set forth.

4. The method of making a tapering article such as a whip out of a piece of material such as ratan, which consists in cutting the entire piece into a sufficient number of tapering strips to make more than one article, then trimming the inner surfaces of the strips which are to be united in the same article so as to make those surfaces fit one another and to make these strips, when combined, form a complete article, and then uniting the strips, substantially as set forth.

5. The method of dividing a natural piece of ratan into aliquot portions, each adapted for use in making tapering articles such as whips, which consists in severing such piece of ratan along helicoidal surfaces intersecting each other at the axis of the piece, the adjacent surfaces of section alternately converging toward and diverging from each other from each end of the piece of ratan in the manner described, whereby the whole piece of ratan is divided into similarly-shaped tapering strips.

6. The method of dividing a piece of suitable material into strips, each adapted for use in making tapering articles such as whips, which consists in severing such piece of material along helicoidal surfaces intersecting each other, the adjacent surfaces of section alternately converging toward and diverging from each other from each end of the piece of material in the manner described.

7. The method of dividing a piece of material such as ratan into strips, each adapted for use in making tapering articles such as whips, which consists in severing such piece of material along helicoidal surfaces, intersecting each other at the axis of the piece, the adjacent surfaces of section alternately converging toward and diverging from each other from each end of the piece of material in the manner described, and trimming the inner surfaces of each strip so as to make those surfaces at substantially the same angle to each other throughout their length, substantially as set forth.

In testimony whereof I have signed my name to this specification in the presence of two subscribing witnesses.

JULIAN POMEROY.

Witnesses:
GEORGE PIRNIE,
RALPH W. ELLIS.